United States Patent
Cunningham et al.

(10) Patent No.: US 10,550,009 B2
(45) Date of Patent: Feb. 4, 2020

(54) SYSTEMS AND PROCESSES FOR THE TREATMENT OF WASTE STREAMS ALLOWING DIRECT ACTIVATED CARBON AND MEMBRANE CONTACT

(71) Applicant: Siemens Energy, Inc., Orlando, FL (US)

(72) Inventors: William Cunningham, Sun Prairie, WI (US); Philip A. Burclaff, Weston, WI (US); Chad L. Felch, Kronenwetter, WI (US); Andrea J. Larson, Wausau, WI (US); Duane R. Smith, Edgar, WI (US); Simon Larson, Wausau, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/318,218

(22) PCT Filed: Jul. 20, 2017

(86) PCT No.: PCT/US2017/042988
§ 371 (c)(1),
(2) Date: Jan. 16, 2019

(87) PCT Pub. No.: WO2018/022403
PCT Pub. Date: Feb. 1, 2018

(65) Prior Publication Data
US 2019/0169047 A1    Jun. 6, 2019

Related U.S. Application Data

(60) Provisional application No. 62/366,201, filed on Jul. 25, 2016.

(51) Int. Cl.
*C02F 1/28* (2006.01)
*B01D 61/16* (2006.01)
(Continued)

(52) U.S. Cl.
CPC .............. *C02F 1/283* (2013.01); *B01D 61/16* (2013.01); *B01D 61/58* (2013.01); *B01D 71/024* (2013.01);
(Continued)

(58) Field of Classification Search
CPC ...... C02F 1/283; C02F 1/444; C02F 2303/16; C02F 2103/365; C02F 2103/16;
(Continued)

(56) References Cited

U.S. PATENT DOCUMENTS 5,932,099 A * 8/1999 Cote ...................... B01D 61/18
                                                      210/151
6,007,712 A * 12/1999 Tanaka .................... C02F 3/085
                                                      210/151
(Continued)

FOREIGN PATENT DOCUMENTS

CN         104058550 A     9/2014

OTHER PUBLICATIONS

Oliver Iorhemen et al: "Membrane Bioreactor (MBR) Technology for Wastewater Treatment and Reclamation: Membrane Fouling", Membranes, vol. 6, No. 2, Jun. 15, 2016 (Jun. 15, 2016), p. 33, XP055441066 / Jun. 15, 2016.
(Continued)

*Primary Examiner* — David C Mellon

(57) ABSTRACT

Methods of treating a high suspended solids liquor having a waste stream and a suspended solids content including powdered activated carbon and biological material by contacting the high suspended solids liquor with a membrane unit are disclosed. Methods of treating a waste stream by combining the waste stream with powdered activated carbon and biological material to produce the high suspended solids liquor and contacting the high suspended solids liquor with a membrane unit are also disclosed. Treatment systems
(Continued)

including a membrane unit fluidly connected to a source of a high suspended solids liquor are disclosed. Treatment systems including a bioreactor fluidly connected to a source of a waste stream and a membrane unit are also disclosed.

18 Claims, 3 Drawing Sheets

(51) Int. Cl.

| | |
|---|---|
| *B01D 61/58* | (2006.01) |
| *B01D 71/36* | (2006.01) |
| *C02F 1/44* | (2006.01) |
| *B01D 71/02* | (2006.01) |
| *B01D 61/02* | (2006.01) |
| *B01D 61/42* | (2006.01) |
| *B01D 61/14* | (2006.01) |
| *B01D 61/18* | (2006.01) |
| *B01D 61/08* | (2006.01) |
| *C02F 3/12* | (2006.01) |
| *B01D 61/04* | (2006.01) |
| *C02F 103/36* | (2006.01) |
| *C02F 103/16* | (2006.01) |

(52) U.S. Cl.
CPC .............. *B01D 71/36* (2013.01); *C02F 1/444* (2013.01); *B01D 61/025* (2013.01); *B01D 61/027* (2013.01); *B01D 61/04* (2013.01); *B01D 61/08* (2013.01); *B01D 61/145* (2013.01); *B01D 61/147* (2013.01); *B01D 61/18* (2013.01); *B01D 61/422* (2013.01); *B01D 71/025* (2013.01); *B01D 2311/04* (2013.01); *B01D 2311/2626* (2013.01); *B01D 2311/2688* (2013.01); *B01D 2315/06* (2013.01); *C02F 1/441* (2013.01); *C02F 3/1273* (2013.01); *C02F 2103/16* (2013.01); *C02F 2103/365* (2013.01); *C02F 2303/16* (2013.01); *Y02W 10/15* (2015.05)

(58) Field of Classification Search
CPC .... C02F 3/06; C02F 3/10; C02F 3/104; C02F 3/105; C02F 3/106; C02F 2003/001; C02F 2003/003; C02F 3/1273; C02F 1/441; B01D 61/58; B01D 71/36; B01D 71/024; B01D 61/027; B01D 61/025; B01D 2311/2688; B01D 2311/2626; B01D 2311/04; B01D 61/422; B01D 61/16; B01D 71/025; B01D 61/147; B01D 61/04; B01D 2315/06; B01D 61/08; B01D 61/18; B01D 61/145; B01J 20/20; B01J 20/3416; B01J 20/3466; Y02W 10/15

See application file for complete search history.

(56) References Cited

U.S. PATENT DOCUMENTS

| | | | |
|---|---|---|---|
| 10,486,987 B2* | 11/2019 | Gaid | B01D 61/027 |
| 2004/0168980 A1* | 9/2004 | Musale | B01D 61/04 |
| | | | 210/639 |
| 2007/0209999 A1 | 9/2007 | Smith et al. | |
| 2007/0241053 A1* | 10/2007 | Uchida | C02F 3/1273 |
| | | | 210/631 |
| 2012/0118813 A1* | 5/2012 | Lescoche | B01D 67/0004 |
| | | | 210/488 |
| 2012/0255903 A1* | 10/2012 | Kloos | B01D 61/16 |
| | | | 210/608 |
| 2015/0329394 A1 | 11/2015 | Wang et al. | |

OTHER PUBLICATIONS

Drews et al: "Membrane fouling in membrane bioreactors-Characterisation, contradictions, cause and cures", Journal of Membrane Science, Elsevier BV, NL, vol. 363, No. 1-2, Nov. 1, 2010 (Nov. 1, 2010), pp. 1-28, XP027261195 / Nov. 1, 2010.
Choon Aun Ng et al: "Operation of Membrane Bioreactor with Powdered Activated Carbon Addition", Separation Science and Technology, vol. 41, No. 7, Jun. 1, 2006 (Jun. 1, 2006), pp. 1447-1466, XP055441067 / Jun. 1, 2006.
PCT International Search Report and Written Opinion of International Searching Authority dated Jan. 25, 2018 corresponding to PCT International Application No. PCT/US2017/042988 filed Jul. 20, 2017.

\* cited by examiner

SYSTEMS AND PROCESSES FOR THE TREATMENT OF WASTE STREAMS ALLOWING DIRECT ACTIVATED CARBON AND MEMBRANE CONTACT

CROSS-REFERENCE TO RELATED APPLICATIONS

This application is a National Stage application of PCT/US2017/042988, filed Jul. 20, 2017, which claimed priority to and the benefit of the filing date of U.S. Provisional Application No. 62/366,201, filed Jul. 25, 2016. The entirety of each application is hereby incorporated by reference.

FIELD

This invention relates to treatment processes and systems, and in particular to processes and systems for removing contaminants from a waste stream.

BACKGROUND

Waste streams are commonly treated by a wide variety of solutions in order to remove organics, solids, and any other undesirable contaminants therefrom. For example, waste streams may be contacted with activated carbon for a time effective to remove organic contaminants therefrom. In some instances, activated carbon is combined with biological material for the removal of readily biodegradable organics from the waste stream. Thereafter, the resulting treated stream requires removal of suspended solids therefrom.

Conventional wisdom is that the concentration of suspended solids should be kept to a moderate level (~8 g/L) in contact with the membrane(s) of such filtration systems. This is due to the fact that elevated solid concentrations typically result in high transmembrane pressure (TMP) during operation. When biological material is utilized, even in combination with activated carbon to remove organic contaminants, the biological material is further thought to cause a rapid rise in transmembrane pressure (TMP) due in part to the consistency of the biological material. Further, long-term operation with the membranes in direct contact with the activated carbon can result in membrane damage. Due to these potential issues, a gravity separation step to further separate solids from the fluid/material to be treated preceding the membrane unit is typically included in membrane filtration systems to reduce or prevent carbon contact with the membranes. In any case, the lower suspended solid limitations for activated carbon or activated carbon/biomass and added components (e.g., clarifiers): (i) reduce efficiency; (ii) add expense, operating time, and materials; and (iii) increase the footprint size of the treatment system. Improved fluid treatment systems that incorporate activated carbon and membrane filtration are thus needed in the art.

BRIEF DESCRIPTION OF THE DRAWINGS

The invention is explained in the following description in view of the drawings that show.

DETAILED DESCRIPTION

Figure 1:
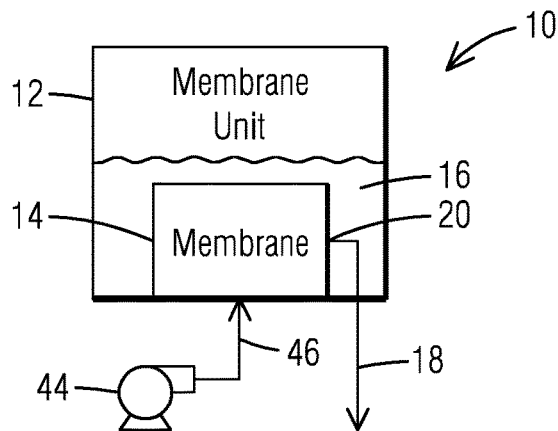
FIG. 1 is a schematic illustration of a system in accordance with an aspect of the present invention.

In accordance with an aspect of the present invention, there are provided systems and process which now more efficiently remove organic contaminants and solids from a waste stream via contact of the waste stream with at least powdered activated carbon and one or more membranes. In a first aspect, there are disclosed systems and processes which allow powdered activated carbon to be contacted with membrane(s) of a membrane filtration in concentrations not previously thought feasible. In certain embodiments, the membrane(s) of the membrane unit(s) in the treatment systems and processes described herein may be contacted with materials having a relatively high suspended solids (also "SS" herein) concentration. For example, the high suspended solids concentration maybe ≥about 12 g/L, and in certain embodiments from about ≥about 12 to about 40 g/L, without resulting in excessive membrane fouling or damage. In certain embodiments, the suspended solids comprise powdered activated carbon and no biomass. In other embodiments, the suspended solids comprise both powdered activated carbon and biomass. As used herein, the term "about" includes value(s) which are ±5% of the stated value.

In one aspect, the increased suspended solids relative to known systems and processes is believed to be made possible by the selection of a membrane material which is capable of being contacted by powdered activated carbon without deterioration/damage following repeated use. In particular, the present inventors have surprisingly found that conventional membrane materials (e.g., polyethersulfone (PES) and polyvinylidene fluoride (PVDF) membranes) rapidly degrade/deform when contacted with high suspended solid liquors comprising activated carbon, but that other membranes (e.g., ceramic and polytetrafluoroethylene (PTFE) membranes) do not exhibit the same deficiencies.

In another aspect, when powdered activated carbon and biomass are present and directed to membrane filtration, the inventors have also found that particular ratios of powdered activated carbon to biomass allow for the operation of membrane filtration without the issues, e.g., pressure/fouling issues, typically seen in carbon/biomass systems. In certain embodiments, powdered activated carbon and biomass are provided from a bioreactor in a predetermined ratio, such as from about 1:1 to about 5:1 by weight. While not wishing to be bound by theory, it is believed at such values the powdered activated carbon is present in an amount that when combined with biological material inhibits the adhesion of biomass to the membrane surface (once delivered thereto). In addition, the powdered activated carbon may readily adsorb biomass secretions (extracellular polymeric substances), a known membrane foulant, thereby maintaining stable operating TMPs.

In accordance with an aspect of the present invention, there is provided a treatment process comprising contacting a high suspended solids liquor comprising at least a waste stream and powdered activated carbon therein with one or more membranes of a membrane unit to generate a filtrate, wherein the high suspended solids liquor comprises a suspended solids concentration of at least about 10 g/L.

In accordance with another aspect, there is provided a treatment process comprising: directing an amount of waste stream comprising an amount of organic contaminants therein to a vessel comprising powdered activated carbon therein to remove the organic contaminants from the waste stream; and directing a first effluent from the vessel to a membrane unit in fluid communication with the vessel to remove solids from the first effluent; wherein a suspended solids (SS) concentration comprising the activated carbon in the first effluent is at least 10 g/L.

In accordance with another aspect, there is provided a treatment system comprising a membrane unit comprising one or more membranes in contact with a high suspended solids liquor comprising powdered activated carbon and a waste stream comprising organic contaminants and suspended solids, wherein the high suspended solids liquor comprises a suspended solids concentration of at least 10 g/L.

In accordance with another aspect, there is provided a treatment system comprising: (i) a waste stream source; (ii) a bioreactor comprising powdered activated carbon and a biomass in fluid communication with the waste stream source, wherein the bioreactor is configured to generate a high suspended solids liquor having a suspended solids concentration of at least 10 g/L, and wherein a weight ratio of the activated carbon to the biomass in the bioreactor is from 1:1 to 5:1; and (iii) a membrane unit comprising one or more membranes in fluid communication with the bioreactor and configured to receive the high suspended solids liquor from the bioreactor.

Referring now to the drawings, FIG. 1 illustrates a first embodiment of a treatment system 10 in accordance with an aspect of the present invention. The system 10 comprises a membrane unit 12 (hereinafter "membrane(s) or membrane") comprising one or more membranes 14. Within the membrane unit 12, the membranes 14 are in contact with a high suspended solids (SS) liquor 16. The high SS liquor 16 comprises at least an amount of powdered activated carbon. The membrane unit 16 is configured to generate a filtrate 18 (from the high SS liquor 16), which may exit from one or more outlets 20 of the membrane unit 14. The high SS liquor 16 comprises a suspended solids concentration of at least about 10 g/L, and in a particular embodiment, from about 12 g/L to about 40 g/L, and in more particular embodiment from about 14 g/L to about 22 g/L.

Figure 2:
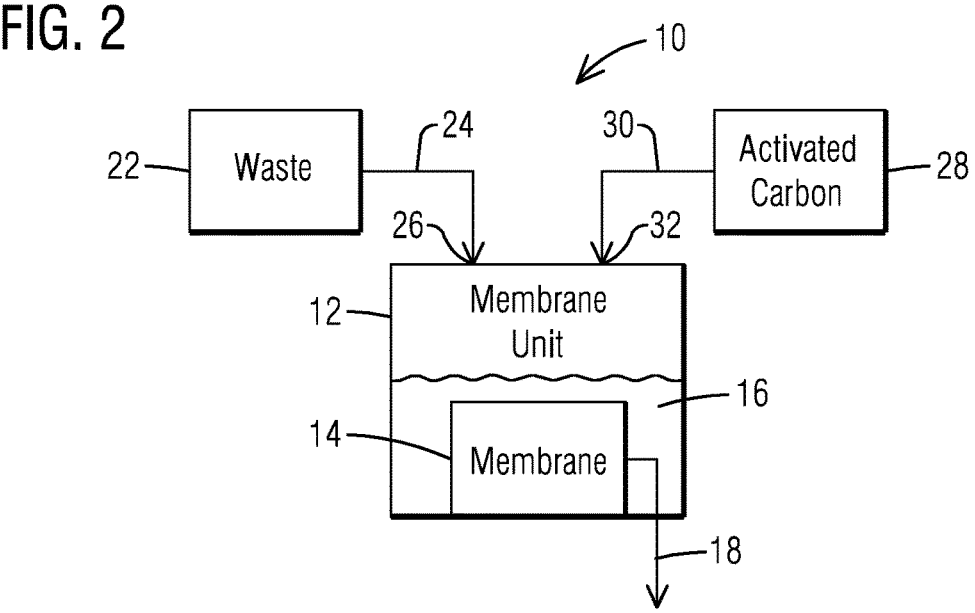
FIG. 2 is a schematic illustration of a system in accordance with another aspect of the present invention.

In certain embodiments, the high SS liquor 16 comprises a waste stream which is also treated with powdered activated carbon in the membrane unit 12 to remove an amount of organic contaminants from the waste stream. Referring to FIG. 2, for example, there is shown a source 22 of a waste stream 24 having an amount of organic contaminants and solids, e.g., dissolved and/or suspended solids, therein. As shown in in FIG. 2, the waste stream 24 is delivered to an inlet 26 of the membrane unit 12 to be treated with powdered activated carbon loaded within the membrane unit 12. In an embodiment, the system 10 includes a source 28 of powdered activated carbon 30, and an amount of powdered activated carbon 30 is delivered from the source 28 to an inlet 32 (which may be the same as inlet 26 or a distinct inlet) of the membrane unit 12. The amount of powdered activated carbon 30 is effective to remove/treat the organic contaminants in the waste stream 24 delivered to the membrane unit 12 by absorption, adsorption, or the like. Optionally, the waste stream 24 and the powdered activated carbon 30 are combined under continuous or periodic mixing. The waste stream 12 is then contacted with the powdered activated carbon 30 for an amount of time effective to remove an amount of the organic contaminants from the waste stream 24.

In an aspect, the waste stream 24 and the powdered activated carbon 30 are provided in amounts that at least collectively provide the high SS liquor 16 (at least 10 g/L) within the membrane unit 12. Periodically or following contact of the waste stream 24 with powdered activated carbon to remove at least a majority (>50% from a starting concentration) of the organic contaminants, a high SS liquor 16 is drawn through the one or more membranes 14 of the membrane unit 12 via a suitable pump or the like to pull the filtrate 18 having a reduced suspended solids concentration (relative to the original waste stream 24).

Figure 3:
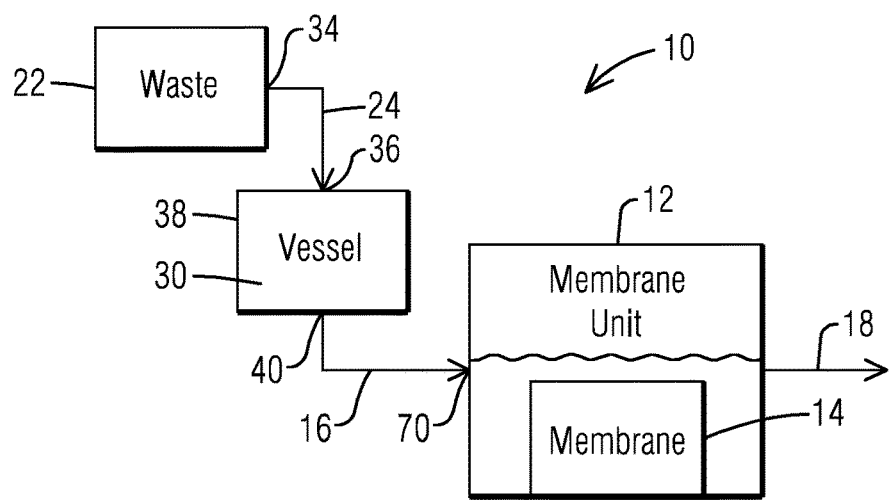
FIG. 3 is a schematic illustration of a system in accordance with another aspect of the present invention.

In another embodiment, the high SS liquor 16 further comprises a waste stream that has already been subjected to treatment with at least powdered activated carbon to remove an amount of organic contaminants therefrom in a discrete vessel or reactor prior to addition to the membrane unit 16. In certain embodiments, at least a majority (>50% by weight or volume) of the organic contaminants are removed by carbon treatment prior to addition to the membrane unit 16. Referring to FIG. 3, for example, the system 10 comprises a waste source 22 having an outlet 34 in fluid communication with an inlet 36 of a vessel 38. The waste source 22 is configured to deliver an amount of the waste stream 24 to the vessel 38 which is dosed with an amount of powdered activated carbon 30 therein effective to remove a desired amount of organic contaminants from the waste stream 24. In some embodiments, the vessel 28 is also in fluid communication with a source of powdered activated carbon (FIG. 2). Following treatment within the vessel 38, an effluent which comprises the high SS liquor 16 is delivered from an outlet 40 of the vessel 38 to an inlet 42 of the membrane unit 16. The input high SS liquor 16 is then drawn through the one or more membranes 14 of the membrane unit 12 as discussed previously via a suitable pump or the like to generate the filtrate 18 having a reduced suspended solids concentration (relative to the original waste stream 24).

In the embodiments described herein, the waste stream 24 may refer to any fluid to be treated for organic and solid contaminant removal. In certain embodiments, the waste stream 24 may comprise one from an industrial, agricultural, or municipal source. In addition, in certain embodiments, the waste stream 24 includes inorganic or organic contaminants capable of being removed by the system 10. In an embodiment, the waste stream 12 may comprise a waste stream from an ethylene production or a refinery process, such as an oil refinery process. In certain embodiments, the waste stream 12 is one that includes biodegradable contaminants.

The membrane unit 12 may comprise one or more porous or semipermeable membranes 14 (also referred to as "membrane(s)" or "membrane" for ease of reference). In an embodiment, the membrane 14 comprises a microfiltration membrane or an ultrafiltration membrane as is known in the art. In addition, the membrane 14 may have any configuration suitable for its intended application, such as a sheet or hollow fibers. Further, the membrane 14 may have any suitable porosity and/or permeability for its intended application. Still further, the membrane 14 may have any suitable shape and cross sectional area such as, for example, a square, rectangular, or cylindrical shape. In one embodiment, the membrane has a rectangular shape.

Within the membrane unit 12, the one or more membranes 14 may be positioned, e.g., vertically, in a treatment zone of the membrane unit 12 in such a way as to be completely submerged by the material, e.g., high SS liquor 16, therein during operation. To reiterate, it is appreciated that the SS liquor 16 described herein comprises the material in the membrane unit 12 that contacts the membrane(s) 14 includes at least an amount of powdered activated carbon 30, as well as a fluid, e.g., the waste stream 24 (before, concurrently, or following primary treatment for organics removal), or a material derived from the waste stream 24 (e.g., reject from the membrane(s) 14. In further embodiments, the high SS liquor 16 comprises a biomass population as set forth below.

In certain embodiments, multiple membranes 14 may be positioned adjacent one another, or located at predetermined positions and may, but need not, be positioned in the same plane as others or parallel to one another. In addition, in certain embodiments, one or more membranes 14 may be mounted directly to the vessel or compartment which forms a treatment zone. Further, one or more membranes 14 may be mounted to a removable module support which may be attached to a vessel or compartment forming the treatment zone. In one embodiment, one or more membranes 14 may be mounted to a support rack to facilitate membrane maintenance and/or replacement. In another embodiment, any, a portion, or all of the membranes 14 described above may be disposed within a corresponding membrane module for housing the membranes 14 and facilitating input and output of material into and away from the membranes 14. When so provided, any suitable number of modules may be provided in an array, rack or a cassette located in one or more corresponding feed-containing vessels or tanks. Further, in an embodiment, the membrane unit 12 comprises a plurality of membrane units 14.

In another aspect, as is illustrated by example in FIG. 1, the membrane unit 12 may include a blower 44 for supplying a gas 46 to scour the membrane(s) 14 and prevent solids build up on a surface of the membrane(s) 14 therein. Each blower 44 may produce fine bubbles, coarse bubbles, a jet stream of gas, a jet of gas and fluid, and combinations thereof. The gas 46 may comprise nitrogen, air, fuel gas, or any other suitable gas. In addition, the blower 44 may be positioned in any suitable location, and for the membrane unit 12, the associated blower 44 may provide gas along a length of one or more membranes 14. Typically also, a pump (not shown) may be provided to generate a suitable suction force to draw fluid through each membrane 14 of the membrane unit 12 to generate the filtrate 18.

In operation, in any of the embodiments described herein, the membrane unit 12 continuously or intermittently draws the high SS liquor 16 to its membrane(s) 14. In certain embodiments, prior thereto or contemporaneously therewith, the waste stream 12 is contacted with the powdered activated carbon material 30 in the membrane unit 12 for a time sufficient to remove an amount of organic contaminants from the waste stream 24. In an embodiment, the waste stream 24 is contacted with the powdered activated carbon 30 for a period of 1 to 24 hours, although it is appreciated that the present invention is not so limited. As fluid is drawn through the membrane(s) 14 leaving suspended solids and the like in the high SS liquor 16 on the reject side of the membrane(s) 14, the membrane unit 12 produces the filtrate 18 which has permeated or traveled through one or more membranes 14 of the membrane unit 12. In certain embodiments, the filtrate 18 comprises a reduced organic contaminants concentration and a reduced total suspended solids concentration relative to the waste stream 24. In an embodiment, the filtrate 18 comprises an organic concentration level of about 50 mg/L or less. In addition, in an embodiment, the membrane unit 12 may be effective to remove at least 99% by weight of suspended solids from the waste stream 24, and in certain embodiments at least 99.99% by weight of suspended solids are removed from the waste stream 24.

The powdered activated carbon 30 may be provided in an amount effective to adsorb or otherwise remove an amount of an organic material from the waste stream 24 below a desired or acceptable level. In addition, the powdered activated carbon may be of any suitable particle size. In accordance with an aspect, the systems and processes described herein enable a high SS liquor ($\geq 10$ g/L) to be contacted with the membranes 14 of the membrane unit 12 without significantly damaging the membranes 14. Thus, in an embodiment, the powdered activated carbon 30 is provided in an amount effective to bring or assist in bringing the SS concentration of the liquor to an amount about 10 g/L, in certain embodiments about 12 to about 40 g/L, and in particular embodiments from about 14 to about 22 g/L.

In an aspect, the powdered activated carbon 30 may be effective to remove an amount of recalcitrant organics therein. As used herein, recalcitrant organics define a class of organics which may be slow or difficult to biodegrade relative to the bulk of organics in the waste stream 24. Examples of recalcitrant organics include synthetic organic chemicals. Other recalcitrant organics include polychlorinated biphenyls, polycyclic aromatic hydrocarbons, polychlorinated dibenzo-p-dioxin, and polychlorinated dibenzofurans. Endocrine disrupting compounds are also a class of recalcitrant organics which can affect hormone systems in organisms, and are found in the environment.

Figure 4:
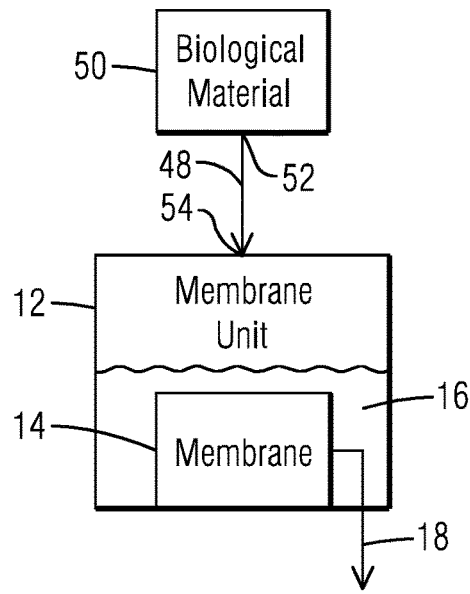
FIG. 4 is a schematic illustration of a system in accordance with yet another aspect of the present invention.

In still another embodiment, it is appreciated that the high SS liquor 16 may comprise an amount of a biological population (also referred to as "biological material" or "biomass" herein). The biomass may be provided in an amount effective to treat the waste stream 24 and reduce an amount of biodegradable material, including non-recalcitrant organics, within the waste stream 24 to a desired degree. By way of example, a biomass may be provided in the SS liquor 16 loaded within the membrane unit 12 illustrated in FIG. 1. To accomplish this, in an embodiment and as shown in FIG. 4, an effective amount of a biomass 48 may be provided from a suitable source 50 thereof to the membrane unit 12. In an embodiment, the source 50 comprises one or more outlets 52 in fluid communication with one or more inlets 54 to the membrane unit 12. In an embodiment, an amount of the waste stream 24 and activated carbon 30 are delivered from respective sources (as shown in FIG. 2) and are mixed with the biomass 48 in the membrane unit 12 in order to provide an SS concentration as specified herein of at least about 10 g/L.

Figure 5:
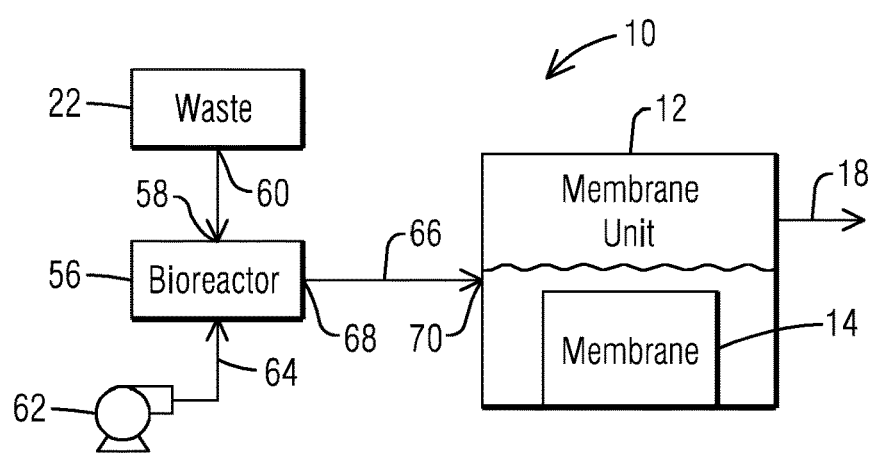
FIG. 5 is a schematic illustration of a system in accordance with yet another aspect of the present invention.

Although including the materials (activated carbon or activated carbon/biological material) directly within the membrane unit 12 provides numerous benefits—including greater treatment efficiency and reduced maintenance, materials, equipment, costs, and time, in still other embodiments, the powdered activated carbon 30 and the biomass 48 may be combined in a bioreactor 56 as is known in the art to reduce an amount of organic contaminants in the waste stream 24. As shown in FIG. 5, for example, there is illustrated an embodiment of the system 10 comprising a bioreactor 56 having one or more inlets 58 in fluid communication with one or more outlets 60 of a waste source 22 as previously described herein, which may deliver an amount of a waste stream 24 to the bioreactor 56. It is appreciated that the powdered activated carbon 30 may be provided separately or collectively to the bioreactor 56 from suitable source(s).

The bioreactor 56 is operated at suitable conditions and for a duration effective to reduce an amount of organic contaminants in the waste stream 24. When necessary or desired, a blower 62 is also in fluid communication with the bioreactor 56 to deliver an amount of a gas 64 thereto to provide the necessary aeration to the biomass 48. Upon completion of treatment in the bioreactor 56, an effluent 66 which comprises a high SS liquor 16 as described herein having a SS concentration of at least 10 g/L is delivered from one or more outlets 68 of the bioreactor 56 to one or more inlets 70 of the membrane unit 12. The high SS liquor 16 is then treated within the membrane unit 12 as previously described herein to produce the filtrate 18. In this embodiment, the liquor 16 comprising the biomass is typically referred to as a mixed liquor, and the SS concentration may be referred to as a mixed liquor suspended solids (MLSS) concentration.

When present, the biological population 48 may include any suitable population of bacterial micro-organisms effective to digest biodegradable.

Exemplary waste stream treatment systems are described in U.S. Pat. Nos. 6,660,163; 5,824,222; and 5,658,458 each of which are incorporated by reference herein in their entirety. The bacteria may comprise any bacteria or combination of bacteria suitable to thrive in anoxic and/or aerobic conditions. Representative aerobic genera include the bacteria *Acinetobacter, Pseudomonas, Zoogloea, Achromobacter, Flavobacterium, Norcardia, Bdellovibrio, Mycobacterium, Shpaerotilus, Baggiatoa, Thiothrix, Lecicothrix*, and *Geotrichum*, the nitrifying bacteria *Nitrosomonas*, and *Nitrobacter*, and the protozoa *Ciliata, Vorticella, Opercularia*, and *Epistylis*. Representative anoxic genera include the denitrifying bacteria *Achromobacter, Aerobacter, Alcaligenes, Bacillus, Brevibacterium, Flavobacterium, Lactobacillus, Micrococcus, Proteus, Pserudomonas*, and *Spirillum*. Exemplary anaerobic organisms include *Clostridium* spp., *Peptococcus anaerobus, Bifidobacterium* spp., *Desulfovibrio* spp., *Corynebacterium* spp., *Lactobacillus, Actinomyces, Staphylococcus* and *Escherichia coli*.

When a biological population is utilized, the combination of powdered activated carbon 30 and biological material 48 constitutes the majority of the SS (MLSS) concentration and is utilized to remove organic contaminants (recalcitrant and non-recalcitrant) from the waste stream 24. The addition of the activated carbon 30 to biological material 48 appears to have a number of benefits aside from their treatment of the waste stream 24. For one, while not wishing to be bound by theory, it is believed that activated carbon 30 assists in the absorption of compounds potentially toxic to the biological material 48, thereby protecting the biological material 48. In addition, it is believed that the powdered activated carbon 30 may enhance membrane surface renewal once delivered to the membrane unit 12, thereby making the membrane surface(s) thereof less susceptible to undesired fouling. In an embodiment, a weight ratio of the powdered activated carbon 30 to biomass 48 in the bioreactor 56 may be from about 1:1 to about 5:1, and in a particular embodiment is from about 3:1 to 5:1.

It is appreciated that the powdered activated carbon 30 may be added to the membrane unit 16 or bioreactor 56 and mixed therein with the biological material 48. In addition, the powdered activated carbon 30 may be added to the membrane unit 16 or bioreactor before, concurrently with, or subsequent to the addition of waste stream 24. In an embodiment, the bioreactor 56 comprises biomass 48 and powdered activated carbon 30, collectively or separately, in one or more treatment zones. As used herein, the phrase "treatment zone" is used to denote an individual treatment region. Individual treatment regions may be housed in a single vessel with one or more compartments. Alternatively, individual treatment regions may be housed in separate vessels and a different treatment is carried out in separate vessels. The treatment zone, e.g., the vessel, tank, or compartment, may be sized and shaped according to a desired application and volume of waste stream to be treated to provide a desired retention time. Accordingly, the bioreactor 56 may itself comprise one or more vessels.

As mentioned above, conventional wisdom held such higher solids concentrations would likely result in an immediate or rapid increase in TMP at the membrane unit 12 upon contact therewith. However, the inventors have found that the suspended solids (SS) concentration could be ≥about 10 g/L in contact with the membrane(s) 14 without excessive membrane fouling in the membrane unit 12 by optimizing the activated carbon/biological material ratio and/or via the selection of the membrane material as described herein. Thus, in an embodiment, an SS concentration of the effluent 66 is ≥about 10 g/L, in certain embodiments is ≥about 12 to about 40 g/L, and in particular embodiments is from about 14 to about 22 g/L. Thus, the activated carbon 30 and the biological material 48 may be provided in the reactor 30 in the ratios described above to arrive at these SS values in the liquor which is delivered to the membrane unit 12.

From the bioreactor 56, at least a portion of the effluent 66 may be directed from the bioreactor 56 to the membrane unit 12, thereby generating a treated stream (filtrate 18) having a reduced suspended solids concentration relative to the effluent 66 and/or waste stream 24. From the membrane unit 12, the filtrate 18 may be directed to further processing (e.g., polishing), disposal (if appropriate), storage, or transport.

In any of the embodiments described herein, it is appreciated more than one of the described component(s) may be provided if suitable or desired. By way of illustration only, the system 10 may comprise multiple membrane units, vessels, bioreactors, or the like as described herein. In certain embodiments, the system 100 comprises at least two bioreactors in flow series with one another. The bioreactors may be identical to one another, or may be different, such as by comprising a different composition, such as a different biomass or biomass environment, or a material comprising a different carbon to biomass ratio. In certain embodiments, one of the bioreactors may be operational to treat the waste stream while the other is taken out of service for maintenance, cleaning, or the like. In certain embodiments, when multiple bioreactors are present, it is appreciated that activated carbon may be added to each bioreactor independently.

In still further embodiments, the powdered activated carbon and biomass may be provided in distinct vessels. Thus, in an embodiment, for example, the bioreactor 56 does not include activated carbon, and instead a separate vessel (not shown) comprising powdered activated carbon may be installed between the bioreactor 56 and the membrane unit 12. In any case (whether internal or external of the membrane unit 12), a waste stream 24 may be treated with powdered activated carbon or powdered activated carbon/biological material for a time effective to reduce an amount of organic contaminants and/or biodegradable contaminants therein. In addition, the liquor directed to or within the membrane unit 12 again will have an SS concentration of ≥about 10 g/L, in certain embodiments is ≥about 12 to about 40 g/L, and in particular embodiments is from about 14 to about 22 g/L.

Figure 6:
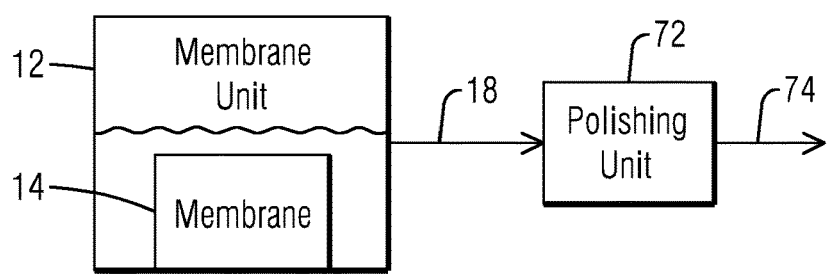
FIG. 6 is a schematic illustration of an additional component (polishing unit) of a system in accordance with another aspect of the present invention.

In accordance with another aspect, in any of the embodiments described herein, the filtrate (effluent) 18 from the membrane unit 12 may be delivered from the membrane unit 12 to a further processing step, such as a polishing unit 72 as shown in FIG. 6. In an embodiment, the amount of organic contaminants and solids in the filtrate 18 leading to the polishing unit 72 is below a predetermined value and/or an amount that would cause fouling of the polishing unit 72.

The polishing unit 72 may comprise any suitable apparatus or system suitable for removing total dissolved solids (TDS) and/or inorganics from the a fluid delivered thereto to produce an effluent 74 having a desired composition, such as one having a TDS concentration below suitable limitations, such as below limits suitable for discharge or reuse of the effluent 74. The selection of the polishing unit 72 is without limitation. In an embodiment, the polishing unit 72 may be selected from the group consisting of a nanofiltration, reverse osmosis, ion exchange, electrodeionization, continuous electrodeionization, and an electrodialysis reversal unit. In a particular embodiment, the polishing unit 72 comprises a reverse osmosis unit, which removes suspended solids from the filtrate 18 by reverse osmosis. In certain embodiments, the effluent from the membrane unit 12 may undergo any additional treatment(s) prior to delivery to the polishing unit 72, such as any of silica removal, pH adjustment, anti-scalant addition, and softening upstream from the polishing unit 72.

Figure 7:
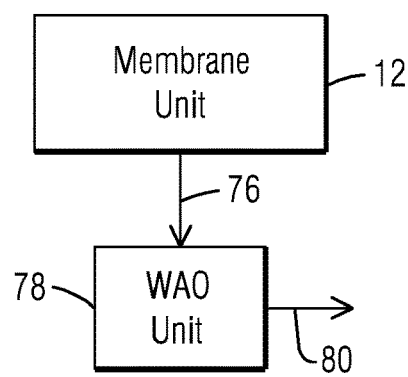
FIG. 7 is a schematic illustration of an additional component (wet air oxidation unit) of a system in accordance with another aspect of the present invention.

In still another aspect, referring to FIG. 7, it is appreciated that a retentate 76 (reject or concentrated solids fraction) that does not travel through the membrane(s) 14 is provided from the membrane unit 12. This retentate 76 may comprise biomass solids (when biomass is utilized), activated carbon (with or without organics adsorbed thereon), and/or other solids in any other suitable form. In an embodiment, the activated carbon comprises an amount of a spent carbon material. In certain embodiments, at least a portion of the retentate 76 is removed from the system 10 and delivered to a wet air oxidation (WAO) unit 78 as is known in the art for regeneration of the spent carbon material and oxidation of biological solids (when present) and oxidizable materials (e.g., organics) therein. By "spent," it is meant that an ability of the carbon material to remove further target components in a target material has at least decreased. It is appreciated that the spent carbon and/or any further solids may also be removed from the systems described herein ("wasting") at any suitable location in the associated system, such as the membrane unit 16, bioreactor(s), or in any suitable flowpath of the system, and then delivered to the WAO unit 78, or to any other desired location.

In an embodiment, the WAO unit 78 comprises one or more dedicated reactor vessels in which regeneration of the spent carbon material and oxidation of relevant components (e.g., organics, inorganics, and/or biological material) may take place under elevated temperature and pressure conditions (relative to atmospheric conditions) in the presence of oxygen. In particular, the components therein may also be heated for a duration and under conditions (e.g., pressure, temperature, and an oxygenated atmosphere) effective for the oxidation and/or regeneration of the spent carbon material to take place so as to produce an effluent 80 which includes at least regenerated carbon product. In an embodiment, the regeneration of the spent carbon is done at a pressure from about 20 atm to about 240 atm and at a temperature from about 150° C. to about 373° C. with the addition of oxygen to the feed stream or the WAO unit.

In certain embodiments, upon regeneration of the spent carbon material, the effluent 80 from the WAO unit 78 (comprising at least regenerated carbon) may be returned to the membrane unit 12, vessel, or bioreactor as the case may be to provide a desired quantity of activated carbon. In other embodiments, the effluent 80 may be directed to a suitable location for storage or transport. In certain embodiments, the effluent 80 may comprise a slurry comprising reactivated carbon material and biological material. In still other embodiments, no WAO unit 78 is provided in the systems and processes described herein. In this case, a portion or all of retentate 76 may be dewatered and then stored, transported as waste, and/or sent offsite for regeneration.

In the systems and processes described herein, it is appreciated that one or more inlets, pathways, outlets, mixers, pumps, valves, coolers, energy sources, flow sensors, or controllers (comprising a microprocessor and a memory), or the like may be included in any of the systems described herein for facilitating the introduction, introduction, output, timing, volume, selection, and direction of flows of any of the components (e.g., MLSS, regenerated carbon, spent carbon, steam, cooling fluids, therein) therein. Moreover, the skilled artisan would understand the volumes, flow rates, and other parameters necessary to achieve the desired result (s).

The function and advantages of these and other embodiments of the present invention will be more fully understood from the following examples. These examples are intended to be illustrative in nature and are not considered to be limiting the scope of the invention.

Examples

Figure 8:
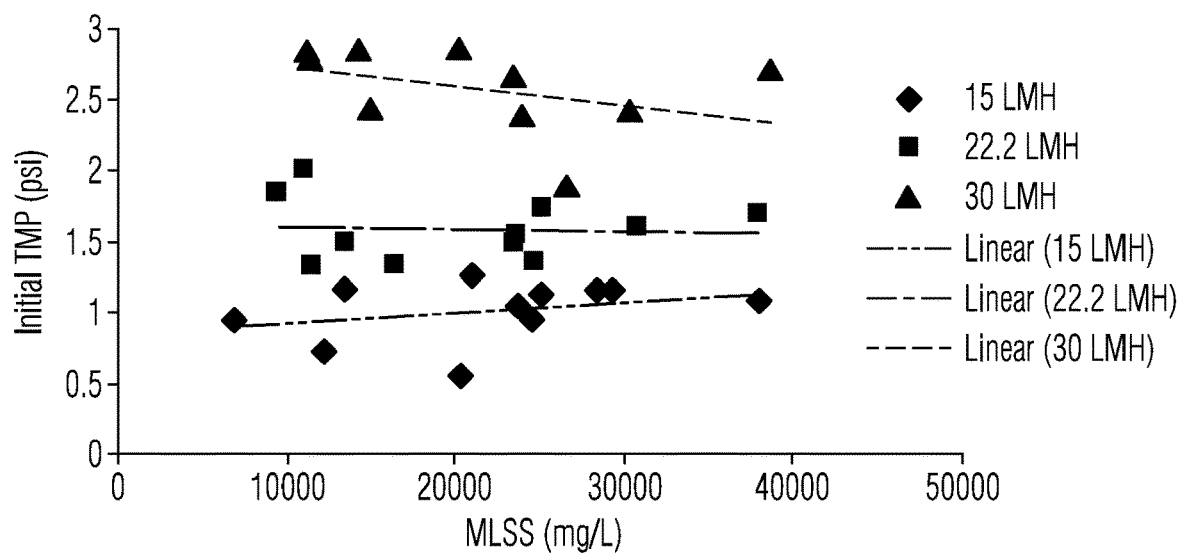
FIG. 8 is a graph showing initial TMP across a membrane at various MLSS concentration values in accordance with an aspect of the present invention.

Typically, MLSS does not exceed 10 g/L in MBR (membrane bioreactor) applications due to potential fouling/high TMP. Testing showed that 20 and even 28 g/L MLSS can be operated with acceptable TMPs and fouling rates. Referring to FIG. 8, FIG. 8 illustrates that flux has a strong effect on the initial TMP as expected. However, it was surprising to find that the change in initial TMP due to the solids concentration was insignificant despite increasing the MLSS concentration by four times conventional MLSS concentration.

Figure 9:
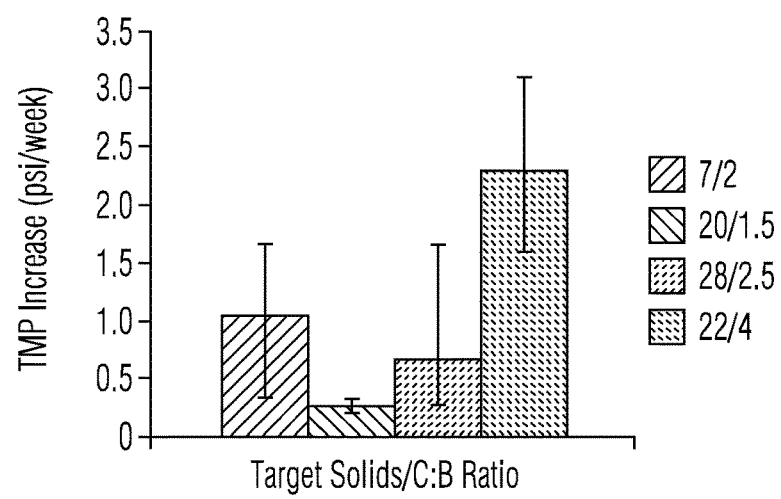
FIG. 9 is a graph showing TMP increase over time for solids at certain MLSS concentration/carbon:biomass ratios in accordance with an aspect of the present invention.

Referring to FIG. 9, an MBR was operated at each of the four solids/C:B ratio conditions shown for 4-8 weeks. From left to right, those values were: 7/2; 20/1.5; 28/2.5 and 22/4. Each week, the fouling (TMP increase) was calculated and used to generate the figure. The bars represent the average TMP increase per week while the whiskers show the maximum and minimum. The MBRs were operated at 20 LMH. The testing supported the conclusion that the mixture of carbon and biomass has a much lower fouling rate than would be expected of biomass alone, even at 12-40 g/L total solids. In fact, at some conditions, the fouling rate was lower at higher MLSS concentrations, which was surprising.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of treating a high suspended solids liquor, the method comprising:
   dosing a waste stream with a biological material to form a biologically treated effluent;
   dosing the biologically treated effluent with a powdered activated carbon at a weight ratio of the powdered activated carbon to the biological material from 1:1 to 5:1 to form the high suspended solids liquor having a suspended solids concentration of at least 10 g/L; and
   contacting the high suspended solids liquor with one or more membranes of a membrane unit to generate a treated filtrate.

2. The method of claim 1, wherein the high suspended solids liquor has the suspended solids concentration of from 12 g/L to 40 g/L.

3. The method of claim 1, wherein the high suspended solids liquor has a weight ratio of the powdered activated carbon to the biological material from 3:1 to 4:1.

4. The method of claim 1, further comprising delivering the filtrate from the one or more membranes to a polishing unit to reduce an amount of inorganic material from the filtrate.

5. The method of claim 1, wherein the waste stream is obtained from a refinery process.

6. The method of claim 1, comprising contacting the high suspended solids liquor with the one or more membranes comprising a ceramic material.

7. The method of claim 1, comprising contacting the high suspended solids liquor with the one or more membranes comprising polytetrafluoroethylene (PTFE).

8. The method of claim 1, further comprising:
   dosing the waste stream with the biological material and dosing the biologically treated effluent with the powdered activated carbon in a bioreactor, and
   delivering the high suspended solids liquor to the membrane unit.

9. The method of claim 1, further comprising regenerating an amount of the powdered activated carbon which is spent in a wet air oxidation unit.

10. A method of treating a waste stream comprising an amount of organic contaminants, the method comprising:
    directing an amount of the waste stream to a bioreactor comprising a biological material in an amount effective to reduce an amount of biological material in the waste stream and produce a biologically treated effluent;
    dosing the biologically treated effluent with a powdered activated carbon in an amount effective to remove at least a fraction of the organic contaminants from the waste stream and produce a high suspended solids liquor having a suspended solids concentration of at least 10 g/L and a weight ratio of the powdered activated carbon to the biological material from 1:1 to 5:1; and
    directing the high suspended solids liquor to a membrane unit in fluid communication with the vessel to remove at least a fraction of the solids from the high suspended solids liquor.

11. A treatment system comprising:
    a bioreactor having an inlet in fluid communication with a source of a waste stream and an outlet, the bioreactor comprising an amount of a powdered activated carbon and a biological material in a weight ratio of the powdered activated carbon to the biological material from 1:1 to 5:1, the bioreactor configured to reduce an amount of organic material from the waste stream and produce a high suspended solids liquor having a suspended solids concentration of at least 10 g/L; and
    a membrane unit separate from the bioreactor and comprising one or more membranes, the membrane unit including a filtrate outlet and an inlet fluidly connected to the bioreactor outlet to receive the high suspended solids liquor, the membrane unit operable to filter the high suspended solids liquor to produce a filtrate which is discharged from the membrane unit through the filtrate outlet.

12. The treatment system of claim 11, wherein the weight ratio of the powdered activated carbon to the biological material is from 3:1 to 4:1.

13. The treatment system of claim 11, further comprising a polishing unit having an inlet fluidly connected to the filtrate outlet of the membrane unit and an effluent outlet, the polishing unit configured to reduce an amount of inorganic material from the filtrate and produce an effluent.

14. The treatment system of claim 11, wherein the one or more membranes comprise a ceramic material.

15. The treatment system of claim 14, wherein the ceramic material comprises a metal oxide material.

16. The treatment system of claim 11, wherein the one or more membranes comprise polytetrafluoroethylene (PTFE).

17. A treatment system comprising:
    a source of a waste stream;
    a bioreactor having an inlet in fluid communication with the source of the waste stream and an outlet, the bioreactor comprising a biomass and configured to produce a biologically treated effluent;
    a vessel having an inlet in fluid communication with the source of the waste stream and an outlet, the vessel comprising powdered activated carbon and configured to produce a high suspended solids liquor having a suspended solids concentration of at least 10 g/L, at least one of the biologically treated effluent and the high suspended solids liquor comprising the powdered activated carbon and the biomass in a weight ratio of the powdered activated carbon to the biomass of from 1:1 to 5:1;
    a membrane unit comprising one or more membranes having an inlet in fluid communication with at least one of the outlet of the bioreactor and the outlet of the vessel, and an outlet, the membrane unit configured to generate a filtrate.

18. The treatment system of claim 17, further comprising a polishing unit having an inlet in fluid communication with the outlet of the membrane unit and an outlet, the polishing unit selected from a nanofiltration unit, a reverse osmosis unit, an ion exchange unit, an electrodionization unit, a continuous electrodionization unit, and an electrodialysis reversal unit.

* * * * *